(12) United States Patent
Sankar et al.

(10) Patent No.: US 9,455,948 B2
(45) Date of Patent: Sep. 27, 2016

(54) REDUCING PROLIFERATION OF NETWORK-TO-LINK-LAYER ADDRESS RESOLUTION MESSAGES

(75) Inventors: Ramkumar Sankar, Karnataka (IN); Varagur Chandrasekaran, Fremont, CA (US); Murali Basavaiah, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 513 days.

(21) Appl. No.: 13/571,794

(22) Filed: Aug. 10, 2012

(65) Prior Publication Data
US 2014/0003426 A1  Jan. 2, 2014

(30) Foreign Application Priority Data
Jun. 29, 2012 (IN) .......................... 2034/DEL/2012

(51) Int. Cl.
*H04L 12/28* (2006.01)
*H04L 29/12* (2006.01)

(52) U.S. Cl.
CPC .................................. *H04L 61/103* (2013.01)

(58) Field of Classification Search
CPC ............................ H04L 12/28; H04L 61/103
USPC ........................................................ 370/390
See application file for complete search history.

(56) References Cited

U.S. PATENT DOCUMENTS 5,309,437 A * 5/1994 Perlman et al. ............. 370/401
7,079,537 B1 * 7/2006 Kanuri et al. ............... 370/392
8,717,888 B2   5/2014 Sankar et al.
8,904,041 B1 * 12/2014 Poutievski et al. .......... 709/245
2002/0080800 A1 * 6/2002 Lee ..................... H04L 12/4641
                                                        370/395.54
2002/0165972 A1 * 11/2002 Chien et al. ................. 709/229
2003/0103507 A1 * 6/2003 Lynch et al. ................. 370/392
2005/0117598 A1 * 6/2005 Iijima et al. ................. 370/412

(Continued)

FOREIGN PATENT DOCUMENTS

WO    WO 2009124444 A1 * 10/2009 ............. H04L 29/12

OTHER PUBLICATIONS

Plummer, "An Ethernet Address Resolution Protocol," RFC 826, The Internet Society, Reston, VA, USA, Nov. 1982, (10 pages).

(Continued)

*Primary Examiner* — Guang Li
(74) *Attorney, Agent, or Firm* — The Law Office of Kirk D. Williams (57) ABSTRACT

In one embodiment, the processing by a packet switching device of a received network-to-link-layer address resolution request message (e.g., Address Resolution Protocol [ARP] Request message, Neighbor Discovery Protocol [NDP] Neighbor Solicitation message) is dependent upon whether or not its target IP address corresponds to a network gateway packet switching device. When the target IP address of a received ARP Request/NDP Neighbor Solicitation message corresponds to a network gateway, then the packet switching device responds effectively on behalf of the network gateway, rather than forwarding the message to the network gateway. When the target IP address of a received ARP Request/NDP Neighbor Solicitation message does not correspond to a network gateway and the Media Access Control (MAC) address corresponding to the target IP address is known, then the packet switching device transforms then sends the broadcast or multicast frame into a unicast frame.

15 Claims, 4 Drawing Sheets

(56) References Cited

U.S. PATENT DOCUMENTS

| | | | |
|---|---|---|---|
| 2006/0015635 A1* | 1/2006 | Fernandes et al. | 709/232 |
| 2008/0137580 A1* | 6/2008 | Axelsson | H04L 29/12009 370/315 |
| 2008/0247395 A1* | 10/2008 | Hazard | 370/392 |
| 2008/0247396 A1* | 10/2008 | Hazard | 370/392 |
| 2009/0307334 A1* | 12/2009 | Maltz et al. | 709/219 |
| 2010/0054253 A1* | 3/2010 | Li | 370/392 |
| 2010/0177778 A1* | 7/2010 | Dobbins | H04L 12/1886 370/395.53 |
| 2010/0272111 A1* | 10/2010 | Kini et al. | 370/395.53 |
| 2012/0033678 A1* | 2/2012 | Page et al. | 370/401 |
| 2012/0089714 A1* | 4/2012 | Carley | H04L 69/28 709/223 |
| 2013/0003738 A1* | 1/2013 | Koganti et al. | 370/392 |
| 2013/0034104 A1* | 2/2013 | Yedavalli | H04L 41/12 370/400 |

OTHER PUBLICATIONS

Comer,"Mapping Internet Addresses to Physical Addresses (ARP)," Internetworking with TCP/IP Principles, Protocols, and Architectures, vol. 1, Fourth Ed., Chapter 5, pp. 77-87, 2000, Prentice Hall, Upper Saddle River, New Jersey.

Nuutti Varis and Jukka Manner, "Minimizing ARP Broadcasting in TRILL," 2009 IEEE Globecom Workshops, Honolulu, HI, Nov. 30-Dec. 4, 2009, (six pages).

Khaled Elmeleegy and Alan L. Cox, "EtherProxy: Scaling Ethernet by Suppressing Broadcast Traffic," INFOCOM 2009, IEEE, Rio de Janeiro, Brazil, Apr. 19-25, 2009, (nine pages).

Himanshu Shah, "ARP Reduction in Data Center," http://tools.ietf.org/html/draft-shah-armd-arp-reduction-00, The Internet Society, Reston, VA, USA, Oct. 18, 2010, (ten pages).

Shah et al., "ARP Broadcast Reduction for Large Data Centers," http://tools.ietf.org/html/draft-shah-armd-arp-reduction-01, The Internet Society, Reston, VA, USA, Oct. 25, 2010 (twelve pages).

S. Cheshire, "IPv4 Address Conflict Detection," RFC 5227, http://datatracker.ietf.org/doc/rfc5227, The Internet Society, Reston, VA, USA, Jul. 2008, (twenty-one pages).

Arkko et al., "IANA Allocation Guidelines for the Address Resolution Protocol (ARP)," RFC 5494, http://datatracker.ietf.org/doc/rfc5494, The Internet Society, Reston, VA, USA, Apr. 2009, (seven pages).

"Cisco FabricPath, At-A-Glance," http://www.cisco.com/c/dam/en/us/products/collateral/switches/nexus-7000-series-switches/at_a_glance_c45-605626.pdf, Cisco Systems, Inc., San Jose, CA, USA, 2010, (two pages).

"Using Cisco Fabric Services," Fabric Manager Software Configuration Guide for the Cisco Nexus 5000 Series Switch, Chapter 7, http://www.cisco.com/c/en/us/td/docs/switches/datacenter/nexus5000/sw/configuration/guide/fm/FabricManager/cfs.pdf, Cisco Systems, Inc., San Jose, CA, USA, Jun. 2008, (twenty pages).

\* cited by examiner

REDUCING PROLIFERATION OF NETWORK-TO-LINK-LAYER ADDRESS RESOLUTION MESSAGES

TECHNICAL FIELD

The present disclosure relates generally to communications networks, including processing network-to-link-layer address resolution messages, especially for resolving Internet Protocol and Media Access Control (MAC) addresses.

BACKGROUND

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology.

Address Resolution Protocol (ARP) is a request/response protocol used in a network to resolve and bind, for example, a Layer 3 (L3) Internet Protocol version 4 (IPv4) address with a Layer 2 (L2) Media Access Control (MAC) address for communicating packets in a L2 network. Similarly, Neighbor Discovery Protocol (NDP) is used to resolve and bind Internet Protocol version 6 (IPv6) address with an L2 MAC address. In a data center, virtual machines can move to different hardware platforms having different MAC addresses. Therefore, networked hosts in a data center network routinely send ARP requests and NDP Neighbor Solicitation messages to maintain the latest information for communicating with a service identified by an IP or other L3 network address.

BRIEF DESCRIPTION OF THE DRAWINGS

The appended claims set forth the features of one or more embodiments with particularity. The embodiment(s), together with its advantages, may be best understood from the following detailed description taken in conjunction with the accompanying drawings of which:

DESCRIPTION OF EXAMPLE EMBODIMENTS

1. Overview

Disclosed are, inter alia, methods, apparatus, computer-storage media, mechanisms, and means associated with reducing proliferation (e.g., broadcasting, multicasting) of network-to-link-layer address resolution messages in a network. In one embodiment, the processing by a packet switching device of a received network-to-link-layer address resolution request message is dependent upon whether or not its target Layer 3 address corresponds to a network gateway packet switching device. In one embodiment, the Layer 3 address is an Internet Protocol version 4 (IPv4) address. In one embodiment, the Layer 3 address is an Internet Protocol version 6 (IPv6) address.

In one embodiment, the network-to-link-layer address resolution request message is an Address Resolution Protocol (ARP) Request. In one embodiment, the network-to-link-layer address resolution request message is a Neighbor Discovery Protocol (NDP) Neighbor Solicitation.

In one embodiment, when the target IP address of a received network-to-link-layer address resolution request message corresponds to a network gateway, then the packet switching device effectively responds on behalf of the network gateway, rather than forwarding the received network-to-link-layer address resolution request message to the network gateway. In one embodiment, when the target IP address of a received network-to-link-layer address resolution request message does not correspond to a network gateway and the Media Access Control (MAC) address corresponding to the target IP address is known, then the packet switching device transforms the received broadcast or multicast received network-to-link-layer address resolution request message into a unicast frame, including the network-to-link-layer address resolution request message, addressed to the MAC address corresponding to the target IP address.

2. Description

Disclosed are, inter alia, methods, apparatus, computer-storage media, mechanisms, and means associated with reducing broadcasting of network-to-link-layer address resolution messages (e.g., ARP Requests, NDP Neighbor Solicitations) in a network. Embodiments described herein include various elements and limitations, with no one element or limitation contemplated as being a critical element or limitation. Each of the claims individually recites an aspect of the embodiment in its entirety. Moreover, some embodiments described may include, but are not limited to, inter alia, systems, networks, integrated circuit chips, embedded processors, ASICs, methods, and computer-readable media containing instructions. One or multiple systems, devices, components, etc. may comprise one or more embodiments, which may include some elements or limitations of a claim being performed by the same or different systems, devices, components, etc. A processing element may be a general processor, task-specific processor, a core of one or more processors, or other co-located, resource-sharing implementation for performing the corresponding processing. The embodiments described hereinafter embody various aspects and configurations, with the figures illustrating exemplary and non-limiting configurations. Note, computer-readable media and means for performing methods and processing block operations (e.g., a processor and memory or other apparatus configured to perform such operations) are disclosed and are in keeping with the extensible scope and spirit of the embodiments. Note, the term "apparatus" is used consistently herein with its common definition of an appliance or device.

Note, the steps, connections, and processing of signals and information illustrated in the figures, including, but not limited to, any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of read the value, process said read value—the value must be obtained prior to processing it, although some of the associated processing may be performed prior to, concurrently with, and/or after the read operation). Also note, nothing described or referenced in this document is admitted as prior art to this application unless explicitly so stated.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the terms "first," "second," etc. are typically used herein to denote different units (e.g., a first element, a second element). The use of these terms herein does not necessarily connote an ordering such as one unit or event occurring or coming before another, but rather provides a mechanism to distinguish between particular units. Moreover, the phrases "based on x" and "in response to x" are used to indicate a minimum set of items "x" from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. Moreover, the term "or" is used herein to identify a selection of one or more, including all, of the conjunctive items. Additionally, the transitional term "comprising," which is synonymous with "including," "containing," or "characterized by," is inclusive or open-ended and does not exclude additional, unrecited elements or method steps. Finally, the term "particular machine," when recited in a method claim for performing steps, refers to a particular machine within the 35 USC §101 machine statutory class.

Disclosed are, inter alia, methods, apparatus, computer-storage media, mechanisms, and means associated with reducing broadcasting of network-to-link-layer address resolution messages (e.g., ARP Requests, NDP Neighbor Solicitations) in a network.

One embodiment includes a method, comprising: receiving, by a packet switching device on a network interface from an external source, a broadcast or multicast network-to-link-layer address resolution request message that includes a target Internet Protocol (IP) address; processing, by the packet switching device, the network-to-link-layer address resolution request message based on a determination of whether the target IP address corresponds to a network gateway device; wherein said processing includes generating (e.g., converting the broadcast/multicast request into a unicast request) and sending a network-to-link-layer address resolution response message in response to determining that the target IP address corresponds to a network gateway device; and wherein said processing includes generating and sending a unicast frame addressed to a Media Access Control (MAC) address corresponding to the target IP address in response to determining that the target IP address does not correspond to a network gateway device.

In one embodiment, the network-to-link-layer address resolution request message is an Address Resolution Protocol (ARP) Request message, and the network-to-link-layer address resolution response message is an ARP Response message. In one embodiment, the network-to-link-layer address resolution request message is Neighbor Discovery Protocol (NDP) Neighbor Solicitation message, and the network-to-link-layer address resolution response message is an NDP Neighbor Advertisement message.

One embodiment includes: maintaining a data structure including indications of whether or not one or more IP addresses correspond to a network gateway device based on snooped Hot Standby Router Protocol (HSRP) or Virtual Router Redundancy Protocol (VRRP) packets; wherein the determination of whether the target IP address corresponds to a network gateway device include performing a lookup operation on the data structure based on the target IP address. One embodiment includes: maintaining a data structure including indications of whether or not one or more IP addresses correspond to a network gateway device based on an exchange of information with one or more other packet switching devices; wherein the determination of whether the target IP address corresponds to a network gateway device include performing a lookup operation on the data structure based on the target IP address. One embodiment includes: periodically broadcasting from the packet switching device a received network-to-link-layer address resolution request message to be leaked rather than normally sending a network-to-link-layer address resolution response message corresponding to the received network-to-link-layer address resolution request message to be leaked.

One embodiment includes a method, comprising: generating by a packet switching device and sending from the packet switching device a specific network-to-link-layer address resolution response message in response to determining that a received specific network-to-link-layer address resolution request message includes a specified target Internet Protocol (IP) address corresponding to another packet switching device that is a network gateway device; and generating by the packet switching device and sending from the packet switching device a particular unicast frame including a particular network-to-link-layer address resolution request message in response to determining that a received particular broadcast or multicast frame includes the particular network-to-link-layer address resolution request message that includes a specified target IP address corresponding to another packet switching device that is not a network gateway device.

In one embodiment, the specific network-to-link-layer address resolution response message is an Address Resolution Protocol (ARP) Response message, the specific network-to-link-layer address resolution request message is an ARP Request message, and the particular network-to-link-layer address resolution request message is an ARP Request message. In one embodiment, the specific network-to-link-layer address resolution response message is a Neighbor Discovery Protocol (NDP) Neighbor Advertisement message, the specific network-to-link-layer address resolution request message is an NDP Neighbor Solicitation message, and the particular network-to-link-layer address resolution request message is an NDP Neighbor Solicitation message.

In one embodiment, the particular broadcast or multicast frame is destination addressed to a broadcast or multicast Media Access Control (MAC) address; wherein the particular network-to-link-layer address resolution request message includes a particular target Internet Protocol (IP) address; and wherein the particular unicast frame is destination addressed to a unicast MAC destination address. One embodiment includes: performing a look up operation in a data structure to determine that the particular target IP address corresponds to another packet switching device that is not a network gateway device. One embodiment includes: performing a look up operation in a data structure to determine that the specified target IP address corresponds to another packet switching device that is a network gateway device. One embodiment includes: maintaining a data structure including indications of whether or not one or more IP addresses correspond to a network gateway device based on snooped Hot Standby Router Protocol (HSRP) or Virtual Router Redundancy Protocol (VRRP) packets. One embodiment includes: maintaining a data structure including indications of whether or not one or more IP addresses correspond to a network gateway device based on an exchange of information with one or more other packet switching devices. In one embodiment, the packet switching device is a Layer 2 switch.

One embodiment includes a packet switching device, comprising: a plurality of interfaces configured to send and receive packets; and one or more processing elements, communicatively coupled to the plurality of interfaces, configured to perform operations. In one embodiment, these operations include: in response to determining that a received specific network-to-link-layer address resolution request message includes a specified target Internet Protocol (IP) address corresponding to another packet switching device that is a network gateway device, generating a specific network-to-link-layer address resolution response message encapsulated in a specific unicast frame; wherein the packet switching device is configured to send the specific unicast frame to a sender of the specific network-to-link-layer address resolution request message from an interface of the plurality of interfaces; and in response to determining that a received particular broadcast or multicast frame includes a particular network-to-link-layer address resolution request message that includes a specified target IP address corresponding to another particular packet switching device that is not a network gateway device, encapsulating the particular network-to-link-layer address resolution request message in a particular unicast frame addressed to the particular packet switching device; wherein the packet switching device is configured to send the particular unicast frame from an interface of the plurality of interfaces.

In one embodiment, the specific network-to-link-layer address resolution response message is an Address Resolution Protocol (ARP) Response message, the specific network-to-link-layer address resolution request message is an ARP Request message, and the particular network-to-link-layer address resolution request message is an ARP Request message. In one embodiment, the specific network-to-link-layer address resolution response message is a Neighbor Discovery Protocol (NDP) Neighbor Advertisement message, the specific network-to-link-layer address resolution request message is an NDP Neighbor Solicitation message, and the particular network-to-link-layer address resolution request message is an NDP Neighbor Solicitation message. In one embodiment, the packet switching device is configured to maintain a data structure including indications of whether or not one or more IP addresses correspond to a network gateway device based on snooped Hot Standby Router Protocol (HSRP) or Virtual Router Redundancy Protocol (VRRP) packets. In one embodiment, the packet switching device is configured to maintain a data structure including indications of whether or not one or more IP addresses correspond to a network gateway device based on an exchange.

One embodiment reduces broadcast Address Resolution Protocol (ARP) messages in a network. In one embodiment, the processing by a packet switching device of a received ARP Request message is dependent upon whether or not its Target IP address corresponds to a network gateway packet switching device.

In one embodiment, a packet switching device generates and sends a specific Address Resolution Protocol (ARP) Response message in response to determining that a received specific ARP Request message includes a specified target Internet Protocol (IP) address corresponding to another packet switching device that is a network gateway device. The packet switching device generates and sends a particular unicast frame including a particular ARP Request message in response to determining that a received particular broadcast frame includes the particular ARP Request message that includes a specified target IP address corresponding to another packet switching device that is not a network gateway device.

In one embodiment, the particular broadcast frame is destination addressed to a broadcast Media Access Control (MAC) address; wherein the particular ARP Request message includes a particular target Internet Protocol (IP) address; and wherein the particular unicast frame is destination addressed to a unicast MAC destination address corresponding to the unicast MAC destination address.

One embodiment includes performing a look up operation in a data structure to acquire the unicast MAC destination address based on the particular target IP address. One embodiment includes performing a look up operation in a data structure to determine that the particular target IP address corresponds to another packet switching device that is not a network gateway device. One embodiment includes performing a look up operation in a data structure to determine that the specified target IP address corresponds to another packet switching device that is a network gateway device. One embodiment includes maintaining a data structure including indications of whether or not one or more IP addresses correspond to a network gateway device based on snooped Hot Standby Router Protocol (HSRP) or Virtual Router Redundancy Protocol (VRRP) packets. One embodiment includes maintaining a data structure including indications of whether or not one or more IP addresses correspond to a network gateway device based on an exchange of information with one or more other packet switching devices (e.g., using Cisco Fabric Services or some other mechanism).

In one embodiment, the packet switching device is a Layer 2 switch. One embodiment includes forwarding a received gratuitous ARP message from the packet switching device. One embodiment includes periodically broadcasting from the packet switching device a received ARP Request message to be leaked rather than normally sending an ARP response message corresponding to the received ARP Request message to be leaked.

Figure 1:
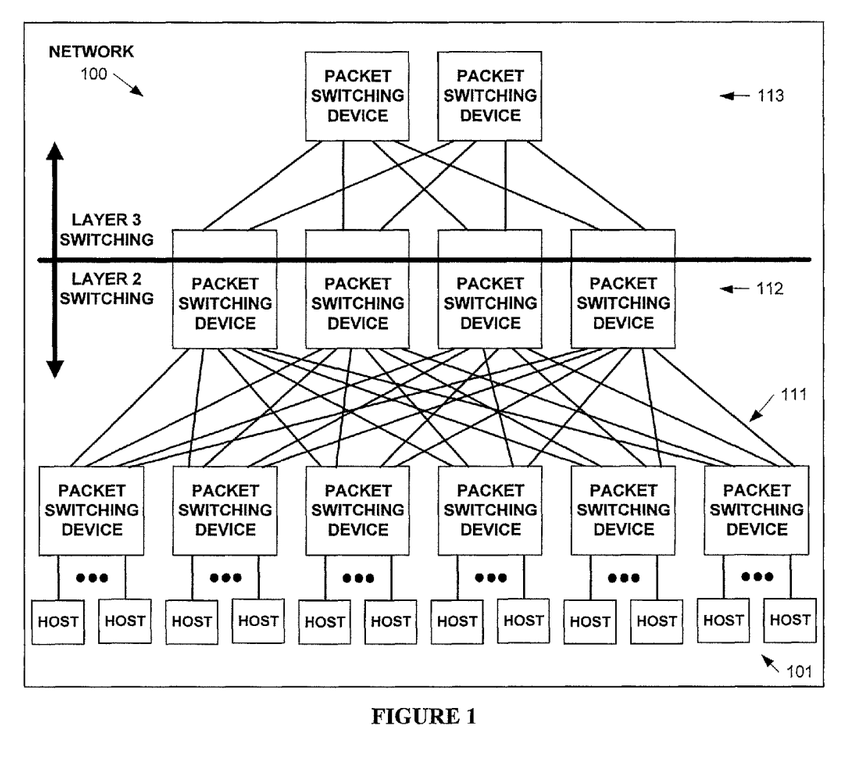
FIG. 1 is a block diagram of a network operating according to one embodiment.

Expressly turning to the figures, an unlimited number of network configurations could operate according to one embodiment. FIG. 1 illustrates a particular network 100 operating according to one embodiment. In one embodiment, network 100 is a data center network. In one embodiment, network 100 is a Cisco FabricPath network.

Network 100 includes multiple rows (111, 112, 113) of packet switching devices, communicatively coupled as shown. Layer 2 (L2) packet switching is performed among rows 111 and 112 of packet switching devices; while layer 3 (L3) packet switching is performed among rows 112 and 113 of packet switching devices. Row 101 of hosts (e.g., computers, typically hosting virtual machines in a data center environment) are communicatively coupled to packet switching devices of row 111 as shown. When two hosts communicate within network 100, packets traverse two packet switching devices from row 111 and one packet switching device from row 112.

Depending on an embodiment, a packet switching device may operate according to IPv4, which typically used ARP as its network-to-link-layer address resolution protocol, and/or IPv6, which typically used NDP as its network-to-link-layer address resolution protocol. Thus, herein, a slash ('/') character is used herein to indicate that it could be one of the types of messages described (e.g., ARP/NDP message typically means ARP message or NDP message).

In one embodiment, each host performs an ARP Request/NDP Neighbor Solicitation for each IP address of a host to which it desires to communicate within network 100 on the order of every thirty seconds. An ARP Request/NDP Neighbor Solicitation is typically encapsulated in a broadcast or multicast L2 frame, and therefore is proliferated throughout network 100. In one embodiment, packet switching devices in row 111 (e.g., the first packet switching device to receive the ARP Request/NDP Neighbor Solicitation from a host) intercept and process ARP Requests/NDP Neighbor Solicitations in a manner to reduce the number of broadcast or multicast ARP Requests/NDP Neighbor Solicitations proliferated through network 100.

An ARP Request/NDP Neighbor Solicitation includes a target IP address, which is the IP address to which a MAC address is trying to be discovered for binding with the IP address. In one embodiment, when the target IP address is an address of a gateway packet switching device (e.g., a packet switching device in row 112 of network 100), the intercepting packet switching device in row 111 generates and sends a unicast ARP Response/NDP Neighbor Advertisement back to the sending host. Effectively, this packet switching device in row 111 responds on behalf of the packet switching device in row 112 having the target IP address. In one embodiment, an intercepting packet switching device is located in row 112 and/or 113 of network 100, rather than, or in addition to, an intercepting packet switching device located in row 111 of network 100.

In one embodiment, when the target IP address is not an address of a gateway packet switching device (e.g., is a target IP address of a host attached to one of the row 111 switches of network 100) and a MAC address has been bound to this target IP address, the intercepting packet switching device in row 111 generates and sends the ARP Request/NDP Neighbor Solicitation in a unicast frame to the known, bound MAC address. In one embodiment, the packet switching device changes the original broadcast or multicast ARP Request/NDP Neighbor Solicitation (e.g., an ARP Request/NDP Neighbor Solicitation in a broadcast or multicast frame) into a unicast ARP Request/NDP Neighbor Solicitation (e.g., an ARP Request/NDP Neighbor Solicitation in a unicast frame), which reduces the broadcasting of ARP Requests/NDP Neighbor Solicitations in network 100.

An operation of one embodiment is described in relation to the flow diagram of FIG. 4, describe hereinafter the descriptions of FIGS. 2A, 2B, 3A and 3B.

Figure 2A:
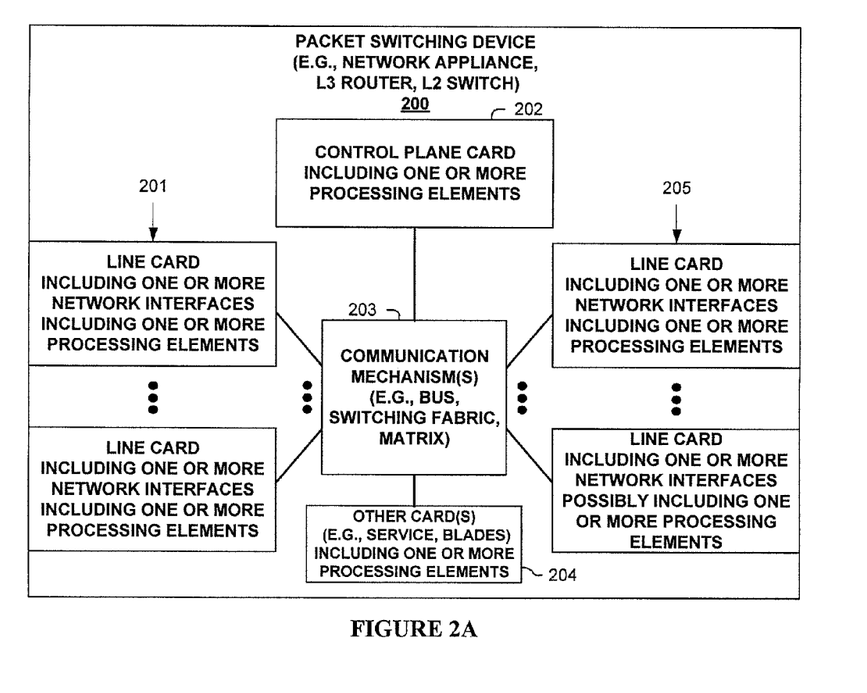
FIG. 2A illustrates a packet switching device according to one embodiment.

One embodiment of a packet switching device 200 (e.g., network appliance, L3 router, L2 switch, L2 bridge) is illustrated in FIG. 2A. As shown, packet switching device 200 includes multiple line cards 201 and 205, each with one or more network interfaces for sending and receiving packets over communications links (e.g., possibly part of a multichassis bundle), and with one or more processing elements that are used in one embodiment for performing processing of ARP/NDP messages. Additionally, packet switching device 200 also has a control plane with one or more processing elements 202 for managing the control plane and/or processing of ARP/NDP messages. Packet switching device 200 also includes other cards 204 (e.g., service cards, blades) which include processing elements that are used in one embodiment to process ARP/NDP messages, and some communication mechanism 203 (e.g., bus, switching fabric, matrix) for allowing its different entities 201, 202, 204 and 205 to communicate.

Figure 2B:
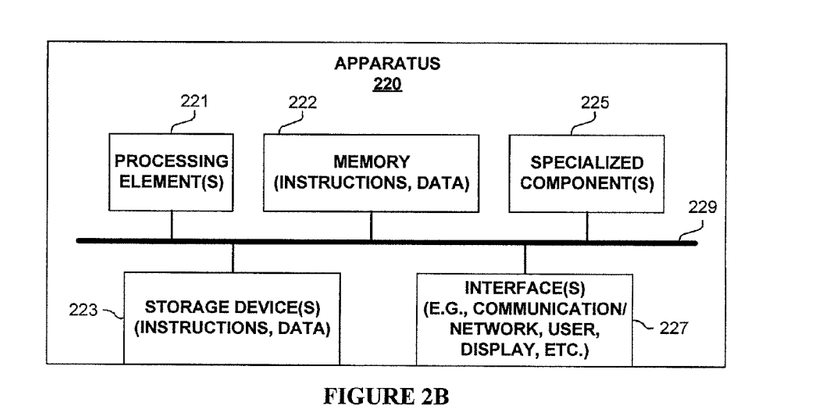
FIG. 2B illustrates an apparatus according to one embodiment.

FIG. 2B is a block diagram of an apparatus 220 used in one embodiment associated with reducing broadcast or multicast ARP/NDP messages in a network. In one embodiment, apparatus 220 performs one or more processes, or portions thereof, corresponding to one of the flow diagrams illustrated or otherwise described herein, and/or illustrated in another diagram or otherwise described herein.

In one embodiment, apparatus 220 includes one or more processing element(s) 221, memory 222, storage device(s) 223, specialized component(s) 225 (e.g. optimized hardware such as for performing lookup and/or packet processing operations, etc.), and interface(s) 227 for communicating information (e.g., sending and receiving packets, user-interfaces, displaying information, etc.), which are typically communicatively coupled via one or more communications mechanisms 229, with the communications paths typically tailored to meet the needs of a particular application.

Various embodiments of apparatus 220 may include more or fewer elements. The operation of apparatus 220 is typically controlled by processing element(s) 221 using memory 222 and storage device(s) 223 to perform one or more tasks or processes. Memory 222 is one type of computer-readable/computer-storage medium, and typically comprises random access memory (RAM), read only memory (ROM), flash memory, integrated circuits, and/or other memory components. Memory 222 typically stores computer-executable instructions to be executed by processing element(s) 221 and/or data which is manipulated by processing element(s) 221 for implementing functionality in accordance with an embodiment. Storage device(s) 223 are another type of computer-readable medium, and typically comprise solid state storage media, disk drives, diskettes, networked services, tape drives, and other storage devices. Storage device(s) 223 typically store computer-executable instructions to be executed by processing element(s) 221 and/or data which is manipulated by processing element(s) 221 for implementing functionality in accordance with an embodiment.

Figure 3A:
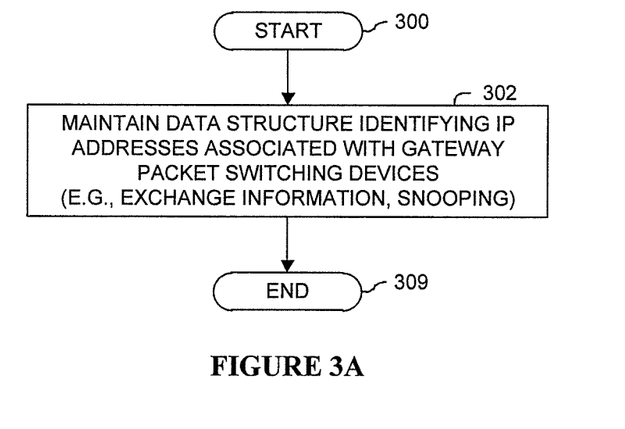
FIG. 3A illustrates a process according to one embodiment.

FIG. 3A illustrates a process performed in one embodiment. Processing begins with process block 300. In process block 302, a data structure is maintained (e.g., created and updated as needed or continuously) that identifies IP addresses associated with gateway packet switching devices. In one embodiment, the IP addresses of gateway packet switching devices are identified by snooping Hello packets of Hot Standby Router Protocol (HSRP) and/or Virtual Router Redundancy Protocol (VRRP). In one embodiment, the IP addresses of gateway packet switching devices are identified by exchanging information with one or more other packet switching devices, such as by, but not limited to, using Cisco Fabric Services. Processing of the flow diagram of FIG. 3A is complete as indicated by process block 309.

Figure 3B:
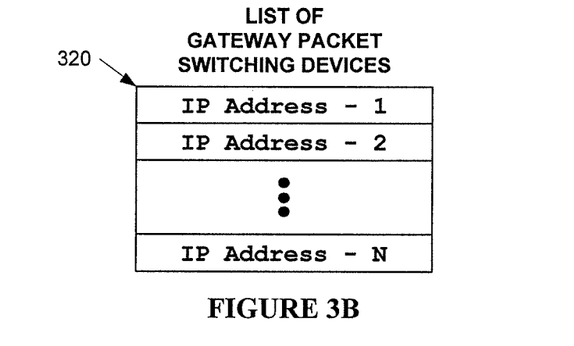
FIG. 3B illustrates a data structure according to one embodiment.

FIG. 3B illustrates a data structure 320 used in one embodiment for identifying whether or not an IP address is that of a gateway packet switch. Data structure 320 is populated with IP addresses of identified gateway packet switching devices (e.g., based on the processing of the flow diagram of FIG. 3A or via some other mechanism). By performing a lookup operation on data structure 320 based on an IP address, if an entry is found, then the IP address corresponds to a gateway packet switching device. If the lookup operation does not find a corresponding entry, then the IP address does not correspond to a gateway packet switching device.

Figure 4:
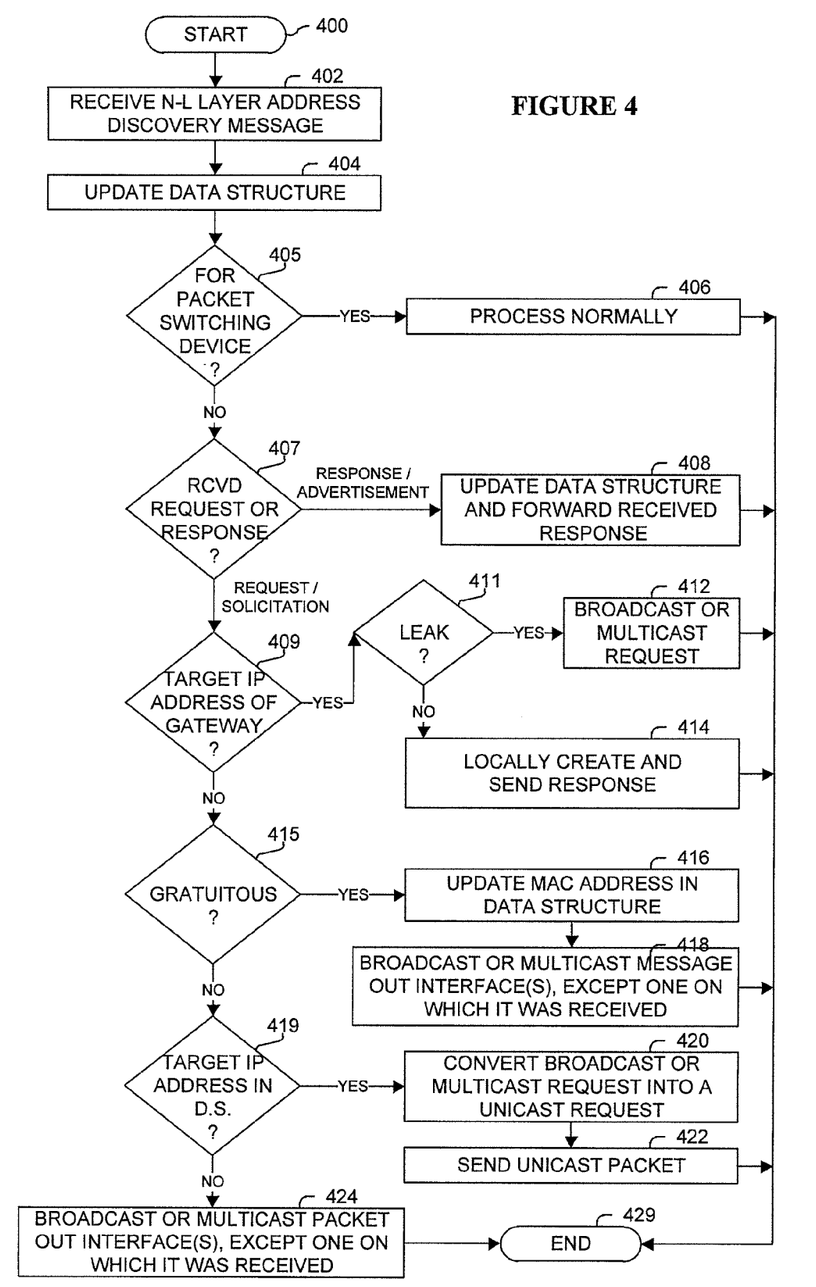
FIG. 4 illustrates a process according to one embodiment.

FIG. 4 illustrates a process performed in one embodiment by a packet switching device. In one embodiment, the packet switching device is any packet switching device in a network. In one embodiment, the packet switching device is the first packet switching device in a network that receives an ARP Request/NDP Neighbor Solicitation from a host device. In one embodiment, the packet switching device is from row 111 in a network configured in a manner to, or similar in nature to, network 100 of FIG. 1.

Processing of the flow diagram of FIG. 4 begins with process block 400. In process block 402, the packet switching device receives and intercepts a network-to-link-layer address resolution message, such as, but not limited to, an ARP message (e.g., ARP Request, ARP Reply) or NDP message (e.g., NDP Neighbor Solicitation, NDP Neighbor Advertisement).

In process block 404, a mapping data structure (containing bindings of MAC addresses with IP addresses) is updated based on information received in the ARP/NDP message (or only if there is a change in information). Note, entries of the mapping data structure are typically aged and correspondingly removed.

As determined in process block 405, if the ARP/NDP message is addressed to the receiving packet switching device itself, then in process block 406, the ARP/NDP message is processed normally. Processing of the flow diagram of FIG. 4 is then complete as indicated by process block 429.

Otherwise, processing continues to process block 407 to determine how to process the ARP/NDP message based on whether it is an ARP Request/NDP Neighbor Solicitation or an ARP Response/NDP Neighbor Advertisement. If it is an ARP Request/NDP Neighbor Advertisement message, then in process block 408, the MAC address to IP binding in a mapping data structure is updated, and the ARP Request/NDP Neighbor Advertisement message is forwarded (e.g., typically in its received encapsulating unicast frame); and processing of the flow diagram of FIG. 4 is then complete as indicated by process block 429. Otherwise, the received ARP/NDP message is an ARP Request/NDP Neighbor Solicitation, and processing proceeds to process block 409.

As determined in process block 409, if the target IP address (e.g., the IP address to which a MAC address binding is being sought) of the ARP Request/NDP Neighbor Solicitation is that of a gateway packet switching device (e.g., as determined by performing a lookup on a mapping data structure, such as, but not limited to, that illustrated in FIG. 3B), then the ARP Request/NDP Neighbor Solicitation will be processed according to process blocks 411-414. Normally, the packet switching device will respond to the ARP Request/NDP Neighbor Solicitation by creating and sending an ARP Reply/NDP Neighbor Advertisement packet in process block 414. However, every so often, it is desirable to "leak" the original broadcast or multicast ARP Request/NDP Neighbor Solicitation by proliferating it throughout the network in process block 412 (e.g., broadcasting in the received encapsulating broadcast or multicast frame out all network interfaces except the one on which the ARP Request/NDP Neighbor Solicitation was originally received). This allows other packet switching devices to receive the ARP Request/NDP Neighbor Solicitation and to update one or more of its mapping data structures so that it is aware of the source IP address of the ARP/NDP message. This may also be useful in detecting the use of duplicate IP addresses in a network. In one embodiment, the decision of process block 411 to leak the ARP Request/NDP Neighbor Solicitation is dependent upon a time duration since the last time the target IP address was leaked in an ARP Request/NDP Neighbor Solicitation packet. For example, one embodiment leaks a target IP address in an ARP Request/NDP Neighbor Solicitation packet the next time such an ARP Request/NDP Neighbor Solicitation packet is received after some number of minutes (e.g., 10, 20, 30, or some value in the range of 1-100). After processing according to process blocks 411-414, processing of the flow diagram of FIG. 4 is then complete as indicated by process block 429.

Otherwise, processing of the ARP Request/NDP Neighbor Solicitation message whose target IP address does not correspond to a gateway packet switching device continues with process block 415. As determined in process block 415, if the ARP Request/NDP Neighbor Solicitation message is a gratuitous ARP/NDP, then the MAC address to IP binding in a mapping data structure is updated in process block 416 (at least if it was not updated in process block 404). Then, in process block 418, the gratuitous ARP/NDP message is broadcast or multicast from the packet switching device (e.g., typically in the received encapsulating broadcast or multicast frame out all network interfaces except the one on which the gratuitous ARP Request/NDP Neighbor Solicitation was originally received). Processing of the flow diagram of FIG. 4 is then complete as indicated by process block 429.

Otherwise, processing of the non-gratuitous ARP Request/NDP Neighbor Solicitation message whose target IP address does not correspond to a gateway packet switching device continues with process block 419. As determined in process block 419, if the target IP address is bound to a MAC address (e.g., as determined based on a lookup operation using the target IP address in a mapping data structure including IP to MAC bindings), then the received broadcast or multicast ARP/NDP message is converted to a unicast ARP/NDP message (e.g., the ARP Request/NDP Neighbor Solicitation is encapsulated in a unicast frame with a destination address of the bound MAC address) in process block 420. The unicast ARP/NDP message is then sent from the packet switching device to the bound MAC address in process block 422.

In one embodiment, the corresponding ARP/NDP binding is removed from the mapping data structure such that if the destination device fails to respond to the unicast ARP/NDP message, the next ARP/NDP message with the target IP address will be broadcast or multicast per process block 424; and if there is a response, the ARP/NDP binding to the IP address will be added to the mapping data structure in process block 404.

In one embodiment, in response to three ARP requests in which no ARP Reply/NDP Neighbor Advertisement is received, the corresponding ARP binding is removed from the mapping data structure such that the fourth ARP Request/NDP Neighbor Solicitation will be broadcast or multicast per process block 424. The next ARP/NDP message with the target IP address will be broadcast or multicast per process block 424; and if there is a response, the ARP/NDP binding to the IP address will be added to the mapping data structure in process block 404

In one embodiment, whenever a broadcast or multicast ARP Request/NDP Network Solicitation message is converted to a unicast message (e.g., in response to the packet switching device already having learned the mapping entry for the target IP address as determined in process block 419), the aging timer for this ARP/NDP binding in the mapping data structure is reduced to be just large enough for a corresponding ARP Response/NDP Neighbor Advertisement message to be received in response to the unicast message. If the response was not received before expiration of this timer, the ARP/NDP binding will be removed from the mapping data structure. The next ARP/NDP message with the target IP address will be broadcast or multicast per process block 424; and if there is a response, the ARP/NDP binding to the IP address will be added to the mapping data structure in process block 404.

These and other approaches allow for a rapid identification of when the concerned target IP address has been re-allocated to some other host, the original host is no longer in the network, etc.

Otherwise, processing determined in process block 419 that a MAC address corresponding to the Target IP address is not known, and processing proceeds to process block 424. Therein, the packet switching device broadcasts the received ARP Request/NDP Neighbor Solicitation message (e.g., sends in the received encapsulating broadcast or multicast frame out all network interfaces except the one on which the ARP Request/NDP Neighbor Solicitation was originally received). Processing of the flow diagram of FIG. 4 is then complete as indicated by process block 429.

In view of the many possible embodiments to which the principles of the disclosure may be applied, it will be appreciated that the embodiments and aspects thereof described herein with respect to the drawings/figures are only illustrative and should not be taken as limiting the scope of the disclosure. For example, and as would be apparent to one skilled in the art, many of the process block operations can be re-ordered to be performed before, after, or substantially concurrent with other operations. Also, many different forms of data structures could be used in various embodiments. The disclosure as described herein contemplates all such embodiments as may come within the scope of the following claims and equivalents thereof.

What is claimed is:

1. A method, comprising:
performing operations including by a packet switching device that is an edge or access physical packet switching device of a network, and with a gateway device being a physical network-layer gateway packet switching devices in the network directly coupled to the packet switching device; wherein the method includes:
receiving, by the packet switching device in the network on a network interface of the packet switching device from an external source which is attempting to access a particular device, different than the packet switching device, through the packet switching device, a particular broadcast or multicast network-to-link-layer address resolution request message that includes a particular target IP address of the particular device;
particular processing, by the packet switching device, the particular broadcast or multicast network-to-link-layer address resolution request message, with said particular processing including generating and sending from the packet switching device a unicast frame addressed to a Media Access Control (MAC) address corresponding to the particular target IP address in response to determining that the particular target IP address does not correspond to a network gateway device in the network and that the particular target IP address is bound to the MAC address;
receiving, by the packet switching device on a network interface from an external source which is attempting to access the gateway device through the packet switching device, a broadcast or multicast network-to-link-layer address resolution request message that includes a target Internet Protocol (IP) address of the gateway device; and
processing, by the packet switching device, the broadcast or multicast network-to-link-layer address resolution request message with said processing including determining to intercept and respond to the broadcast or multicast address resolution request message without forwarding the broadcast or multicast address resolution request message to the gateway device with said determination to intercept based on identifying that the target IP address corresponds to the gateway device which has been previously learned by the packet switching device, and generating and sending a network-to-link-layer address resolution response message replying to the broadcast or multicast address resolution request message.

2. The method of claim 1, wherein the broadcast or multicast network-to-link-layer address resolution request message is an Address Resolution Protocol (ARP) Request message, and the network-to-link-layer address resolution response message is an ARP Response message.

3. The method of claim 1, wherein the broadcast or multicast network-to-link-layer address resolution request message is Neighbor Discovery Protocol (NDP) Neighbor Solicitation message, and the network-to-link-layer address resolution response message is an NDP Neighbor Advertisement message.

4. The method of claim 1, comprising: maintaining a data structure including indications of whether or not one or more IP addresses correspond to a network gateway device based on snooped Hot Standby Router Protocol (HSRP) or Virtual Router Redundancy Protocol (VRRP) packets; wherein said identification of whether the target IP address corresponds to a network gateway device include performing a lookup operation on the data structure based on the target IP address.

5. The method of claim 1, comprising: maintaining a data structure including indications of whether or not one or more IP addresses correspond to a network gateway device based on an exchange of information with one or more other packet switching devices; wherein said identification of whether the target IP address corresponds to a network gateway device include performing a lookup operation on the data structure based on the target IP address.

6. The method of claim 1, comprising: periodically broadcasting from the packet switching device a received broadcast or multicast network-to-link-layer address resolution request message to be leaked rather than normally sending a network-to-link-layer address resolution response message corresponding to the received network-to-link-layer address resolution request message to be leaked.

7. The method of claim 1, comprising: performing a look up operation in a data structure to determine that the particular target IP address corresponds to another packet switching device that is not a network gateway device.

8. The method of claim 7, comprising: maintaining the data structure, with the data structure including indications of whether or not one or more IP addresses correspond to a network gateway device based on snooped Hot Standby Router Protocol (HSRP) or Virtual Router Redundancy Protocol (VRRP) packets.

9. The method of claim 7, comprising: maintaining the data structure, with the data structure including indications of whether or not one or more IP addresses correspond to a network gateway device based on an exchange of information with one or more other packet switching devices.

10. The method of claim 1, wherein the packet switching device is a Layer 2 switch.

11. A packet switching device, comprising:
a plurality of interfaces configured to send and receive packets in a network; and one or more processing elements, communicatively coupled to the plurality of interfaces, with the packet switching device being configured to perform operations, including:
receiving on a first network interface of the plurality of interface from an external source which is attempting to access a particular device, different than the packet switching device, through the packet switching device, a particular broadcast or multicast network-to-link-layer address resolution request message that includes a particular target IP address of the particular device; and
particular processing the particular broadcast or multicast network-to-link-layer address resolution request message, with said particular processing including generating and sending from a second interface of the plurality of interfaces a unicast frame addressed to a Media Access Control (MAC) address corresponding to the particular target IP address in response to determining that the particular target IP address does not correspond to a network gateway device in the network and that the particular target IP address is bound to the MAC address; and
in response to determining to intercept and respond to a specific broadcast or multicast network-to-link-layer address resolution request message, received from an external source which is attempting to access the gateway device through the packet switching device, without forwarding the specific broadcast or multicast network-to-link-layer address resolution request message to the gateway device with said determination to intercept based on identifying that the specific broadcast or multicast network-to-link-layer address resolution request message includes a specified target Internet Protocol (IP) address of the gateway device which has been previously learned by the packet switching device, generating a specific network-to-link-layer address resolution response message encapsulated in a specific unicast frame, and sending the specific unicast frame to a sender of the specific broadcast or multicast network-to-link-layer address resolution request message from an interface of the plurality of interfaces.

12. The packet switching device of claim 11, wherein the specific broadcast or multicast network-to-link-layer address resolution response message is an Address Resolution Protocol (ARP) Response message, the specific network-to-link-layer address resolution request message is an ARP Request message, and the particular network-to-link-layer address resolution request message is an ARP Request message.

13. The packet switching device of claim 11, wherein the specific broadcast or multicast network-to-link-layer address resolution response message is a Neighbor Discovery Protocol (NDP) Neighbor Advertisement message, the specific network-to-link-layer address resolution request message is an NDP Neighbor Solicitation message, and the particular network-to-link-layer address resolution request message is an NDP Neighbor Solicitation message.

14. The packet switching device of claim 11, wherein the packet switching device is configured to maintain a data structure including indications of whether or not one or more IP addresses correspond to a network gateway device based on snooped Hot Standby Router Protocol (HSRP) or Virtual Router Redundancy Protocol (VRRP) packets.

15. The packet switching device of claim 11, wherein the packet switching device is configured to maintain a data structure including indications of whether or not one or more IP addresses correspond to a network gateway device based on an exchange of information with one or more other packet switching devices.

* * * * *